United States Patent
Takagi

(10) Patent No.: US 8,082,965 B2
(45) Date of Patent: Dec. 27, 2011

(54) RUBBER SHEET JOINING APPARATUS

(75) Inventor: Shigemasa Takagi, Gifu (JP); Chikara Takagi, legal representative, Gifu (JP)

(73) Assignees: Fuji Seiko Co., Ltd., Hashima-shi (JP); Fuji Shoji Co., Ltd., Hashima-shi (JP)

( * ) Notice: Subject to any disclaimer, the term of this patent is extended or adjusted under 35 U.S.C. 154(b) by 857 days.

(21) Appl. No.: 11/868,713

(22) Filed: Oct. 8, 2007

(65) Prior Publication Data

US 2008/0223507 A1    Sep. 18, 2008

(30) Foreign Application Priority Data

Oct. 10, 2006  (JP) ................................. 2006-276618

(51) Int. Cl.
*B29D 30/08* (2006.01)
(52) U.S. Cl. ...................... 156/397; 156/394.1; 156/396; 156/512; 156/517; 156/557; 156/558; 156/566; 156/568; 156/304.1; 156/304.5
(58) Field of Classification Search ............... 156/304.1, 156/304.5, 304.6, 394.1, 396, 512, 517, 557, 156/558, 566, 568
See application file for complete search history.

(56) References Cited

U.S. PATENT DOCUMENTS 5,514,233 A * 5/1996 Miyamoto ..................... 156/64

2006/0272780 A1   12/2006  Takagi

FOREIGN PATENT DOCUMENTS

| AU | 529045 | 1/1981 |
| EP | 0 958 913 A1 | 11/1999 |
| EP | 1 431 023 A2 | 6/2004 |
| JP | 2002-240160 | 8/2002 |
| WO | WO 00/46013 | 8/2000 |
| WO | WO 2006/037723 A1 | 4/2006 |

* cited by examiner

*Primary Examiner* — Mark A Osele
*Assistant Examiner* — Nickolas Harm
(74) *Attorney, Agent, or Firm* — Oblon, Spivak, McClelland, Maier & Neustadt, L.L.P.

(57) ABSTRACT

A rubber sheet joining apparatus includes a cutting unit for cutting a ribbon of rubber sheet reinforced with cords to generate rubber sheet strips having different lengths; a sheet overlapping unit for overlapping and joining the rubber sheet strips having different lengths to make an overlapped and joined strip. First holding members hold a front end portion of a following overlapped and joined strip. Second holding members hold a rear end portion of a preceding overlapped and joined strip. Support guides movably support the first holding members relative to the second holding members. An operating unit moves the first holding members relative to the second holding members to butt-join the side surfaces of two successive overlapped and joins strips held respectively by the first holding members and the second holding members to generate a ply sheet.

4 Claims, 13 Drawing Sheets

RUBBER SHEET JOINING APPARATUS

INCORPORATION BY REFERENCE

This application is based on and claims priority under 35 U.S.C. 119 with respect to Japanese Application No. 2006-276618 filed on Oct. 10, 2006, the entire content of which is incorporated herein by reference.

BACKGROUND OF THE INVENTION

1. Field of the Invention

The present invention relates to a rubber sheet joining apparatus and a method for overlapping and joining plural rubber sheet strips having different lengths, and for butt-joining side surfaces of the rubber sheet strips which are overlapped and joined. In particular, the present invention relates to a rubber sheet joining apparatus and a method for joining the rubber sheets to make a ply sheet for a body ply which is suitable for a low-profile tire.

2. Discussion of the Related Art

A body ply is used in a tire for a vehicle, wherein the body ply is reinforced with cords made of organic fiber or inorganic steel wire. In a general mass production, a large roll is made by winding a wide rubber sheet that is made in a manner that hundreds of the cords are aligned in parallel and a coat of rubber is applied onto the cords by a large calendar. The wide rubber sheet unwound from the large roll is cut to make a strip having a width corresponding to a width of the body ply determined according to the kind or the size of the tire by using a large cutting machine. A small roll having a width corresponding to a size of the tire is made by winding a ply sheet that is made by overlapping and joining end portions of the long strips cut off from the rubber sheet unwound from the large roll. The small roll is provided to the forming drum during tire forming.

Meanwhile, in a recent typical many kinds of small quantity production, a ribbon of rubber sheet reinforced with about ten to dozens of cords is cut to make a strips having a length corresponding to the width of the body ply, and a small roll is made by winding a ply sheet that is made by joining the strips at the side surfaces thereof. Then, the small roll is provided to the forming drum during tire forming.

In either case, a piercing treatment is performed through the ply sheet between the cords embedded therein to make through holes for extracting air between the ply sheets overlapped during manufacturing the tire. In either case of the calendar type and the ribbon type, since the piercing treatment is performed on the ply sheet reinforced with embedded cords while it runs continuously, the cords may be damaged. Also, there are problems that the through holes are clogged and air remains inside the body ply during tire forming and vulcanizing, since the operation of winding and rewinding is repeated due to a process for winding the ply sheet to make the small roll, and a process for rewinding the ply sheet from the small roll to wind the ply sheet around the forming drum to make the body ply.

Recently, a high rupture strength is required to the tire of a large size or the tire for SUV, and it is necessary for a low-profile tire to improve vehicle stability, wherein strict performance is required to the side portion of the low-profile tire. Therefore, such structure is used that the plural ply sheets are entirely overlapped and joined.

For example, there is a type disclosed in the Japanese Laid Open Patent Publication NO. 2002-240160, as a ribbon production type which is suitable to the many kinds of small quantity production, where a body ply has two ply layers made by entirely overlapped two ply sheets. However, in the Japanese Laid Open Patent Publication NO. 2002-240160, since the body ply is made of entirely overlapped two ply sheets having the same width, the width end portions of the two ply sheets coincide with each other, whereby a large repeated stress due to the tire running is concentrated on the width end portion of the body ply. Two ply sheets having different width are overlapped, so that the width ends of the two ply sheets do not coincide with each other to avoid the large repeated stress concentration on the width end portion of the body ply. In the mass production, two kinds of small rolls of ply sheets having different width are made by using a large calendar and a large cutting machine. The two ply sheets having different width are overlapped, so that the width ends of the two overlapped ply sheets do not coincide with each other. Thus, it can be prevented that the large repeated stress concentrates on the width end of the body ply.

As described above, the width ends of the two overlapped ply sheets are avoided to coincide with each other, so as to prevent the large repeated stress concentration on the width end of the body ply. However, it is difficult to make the width ends of the two overlapped ply sheets do not coincide with each other in the many kinds of small quantity production disclosed in the Japanese Laid Open Patent Publication NO. 2002-240160. On the other hand, in the mass production, the two small rolls having different width are provided around a forming machine to overlap the two ply sheets having different width. First, the ply sheet having the large width is wound on the forming drum from the one small roll having large width. Next, the ply sheet having the small width from the other small roll having the small width is wound on the forming drum over the ply sheet having the large width. Thus, two ply sheets having different width are overlapped and joined.

In the mass production, it is possible to manufacture the tire by using two kinds of ply sheets having different width. However, in this type, the two kinds of small rolls must be manufactured by using the large calendar and the large cutting machine, and the two kinds of small rolls need to be arranged around the forming machine. Thus, manufacturing facilities become large in size, and manufacturing cost increases. Further, there is a problem that a wide facilities space is required due to the large facilities. In order to meet a recent trend of tire of many kinds of small quantity, it is a problem to arrange the large calendar and the large cutting machine. Further, it is also difficult to gain inventory space or inventory control suitable for handling various small rolls for making tires of various kinds. Since the ply sheet unwound from the small roll has a joined portion where the end portions of strips are overlapped and joined circumferentially of the small roll, the thickness of the pry sheet on the circumference of the body ply is not uniform, and uniformity of the tire deteriorates.

In addition, if the cords are damaged during the piercing treatment for forming through hole to extract air, strength of the body ply in the tire deteriorates. Since operation of winding and unwinding is repeated after the piercing treatment, the through holes may be clogged. If the ply sheets are overlapped and joined without aligning through holes made through one ply sheets with through holes made through another ply sheet, it is difficult to extract air to make a problem that air remains after tire forming and vulcanizing processes.

SUMMARY OF THE INVENTION

Accordingly, it is a primary object of the present invention to provide a rubber sheet joining apparatus for cutting plural rubber sheet strips having different lengths from a ribbon of rubber sheet reinforced with cords to overlap and join the rubber sheet strips, and for butt-joining side surfaces of the overlapped and joined strips so as to make a ply sheet that is suitable to make a body ply of a low-profile tire. Also, the present invention provides a rubber sheet joining apparatus for reliably performing piercing treatment between the cords.

Accordingly, the present invention, there is provided a rubber sheet joining apparatus comprising: a cutting unit for cutting a narrow width ribbon of rubber sheet reinforced with cords extending in a longitudinal direction of the ribbon at a right angle to the ribbon in different lengths to generate plural different rubber sheet strips having different lengths, one of the plural different rubber sheet strips having a length corresponding to a width of a body ply of a tire; a sheet overlapping unit for providing the plural different rubber sheet strips having different lengths made by the cutting unit to a certain position to overlap and join the plural different rubber sheet strips having different lengths to make an overlapped and joined strip in which the centers of the plural different rubber sheet strips having different lengths are aligned with each other in a longitudinal direction of the rubber sheet strips; first holding members for holding a front end portion of a following overlapped and joined strip made by the sheet overlapping unit; second holding members for holding a rear end portion of a preceding overlapped and joined strip made by the sheet overlapping unit; support guides for movably supporting the first holding members relative to the second holding members; and an operating unit for moving the first holding members relative to the second holding members to butt-join the side surfaces of two successive overlapped and joined strips held respectively by the first holding members and the second holding members to generate a ply sheet for the body ply of the tire.

By the rubber sheet joining apparatus according to the present invention, rubber sheet strips having different lengths can be easily made by the cutting unit, being overlapped and joined each other by the sheet overlapping unit, and the overlapped and joined strips are joined at side surfaces thereof by the operating unit that moves the first holding members relative to the second holding members. As a result, it dissolves a problem that it is difficult to keep inventory space or inventory control. The rubber sheet joining apparatus requires the small installment space therefor and small manufacturing cost compared to conventional method. Further, it is possible to manufacture the ply sheet which is uniform in thickness on the circumference of body ply.

BRIEF DESCRIPTION OF THE ACCOMPANYING DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

Figure 3:
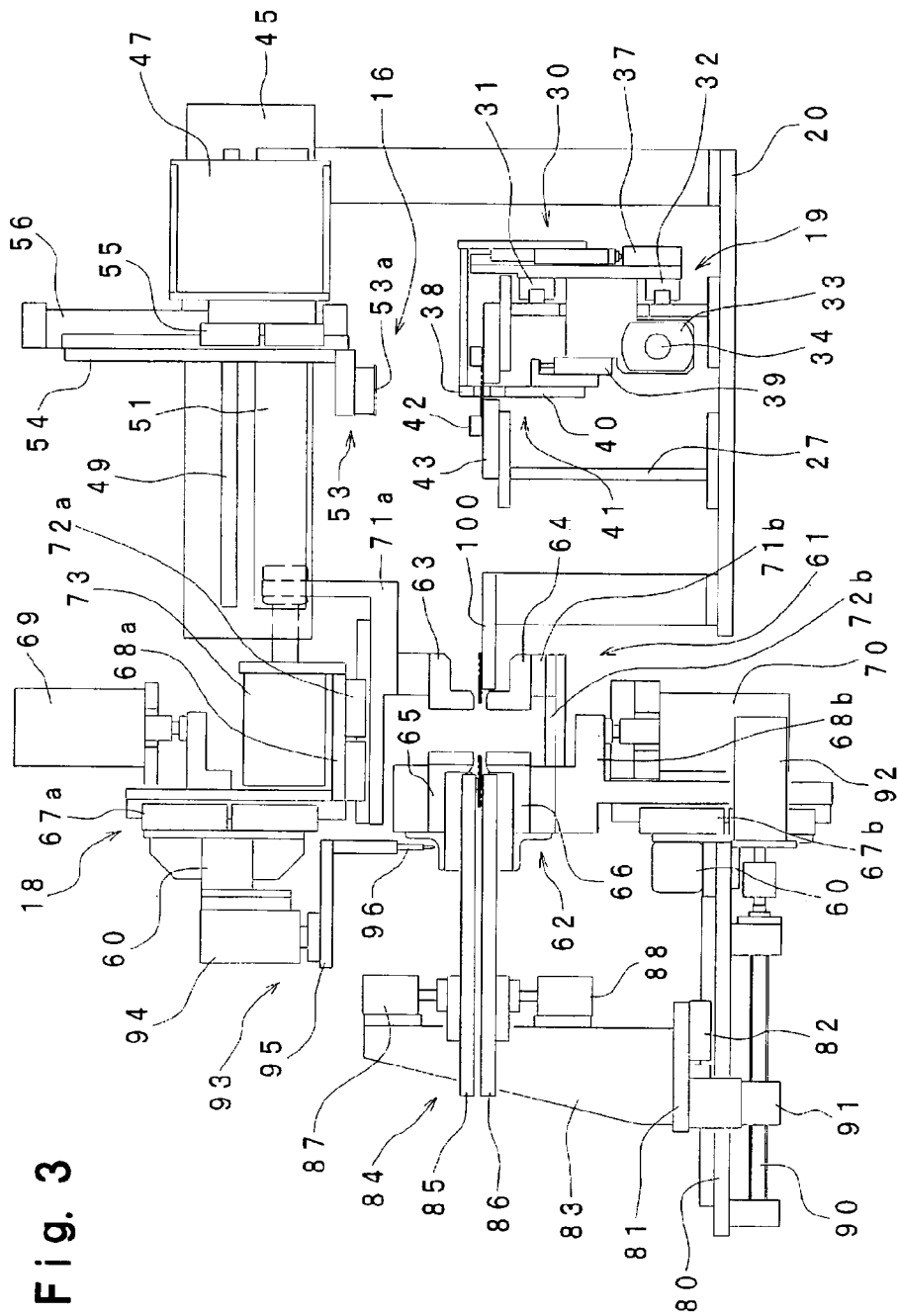
FIG. 3 is a side view illustrating a rubber sheet joining apparatus as viewed in the direction of an arrow 3 in FIG. 1.
Figure 12:
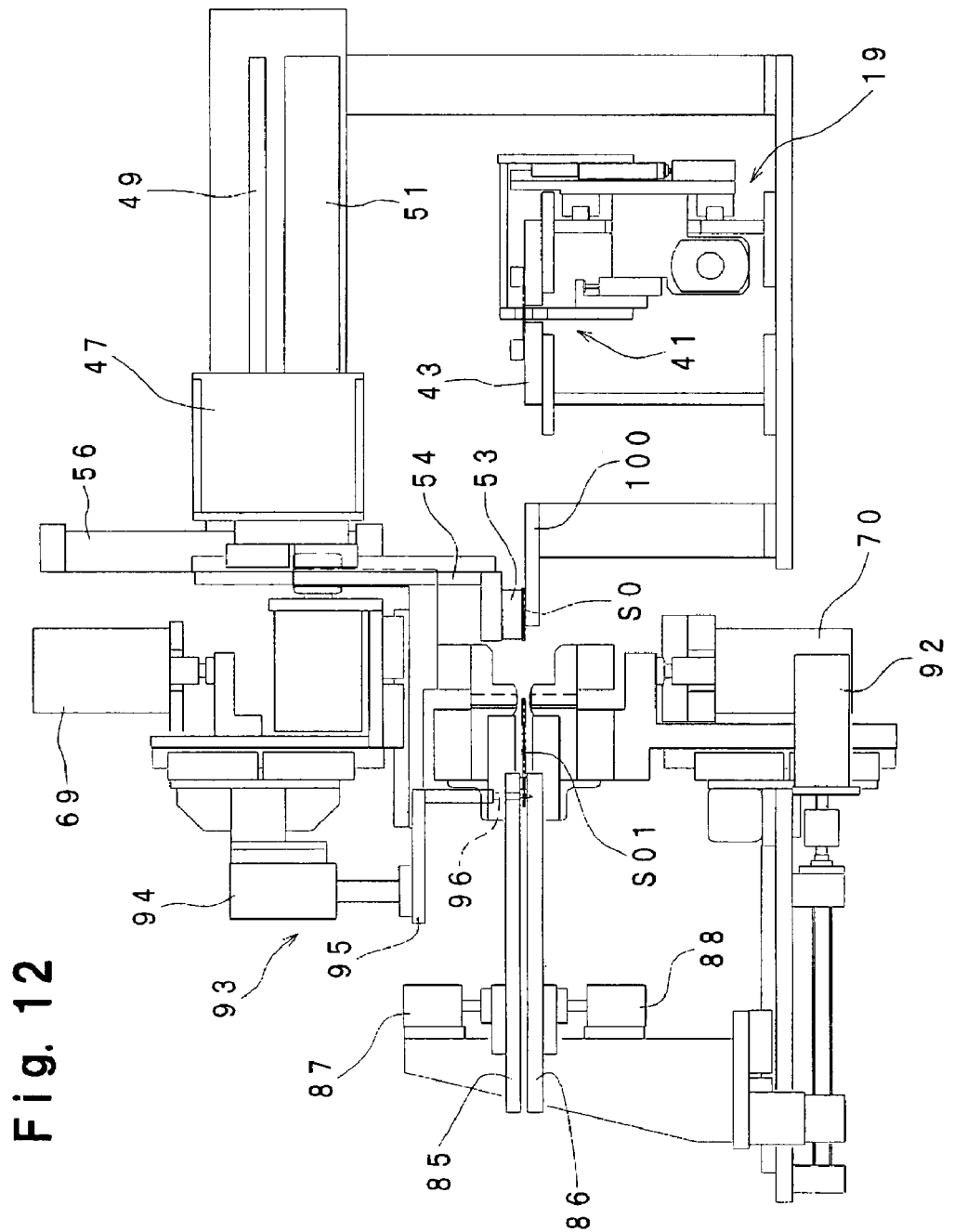
Figure 13:
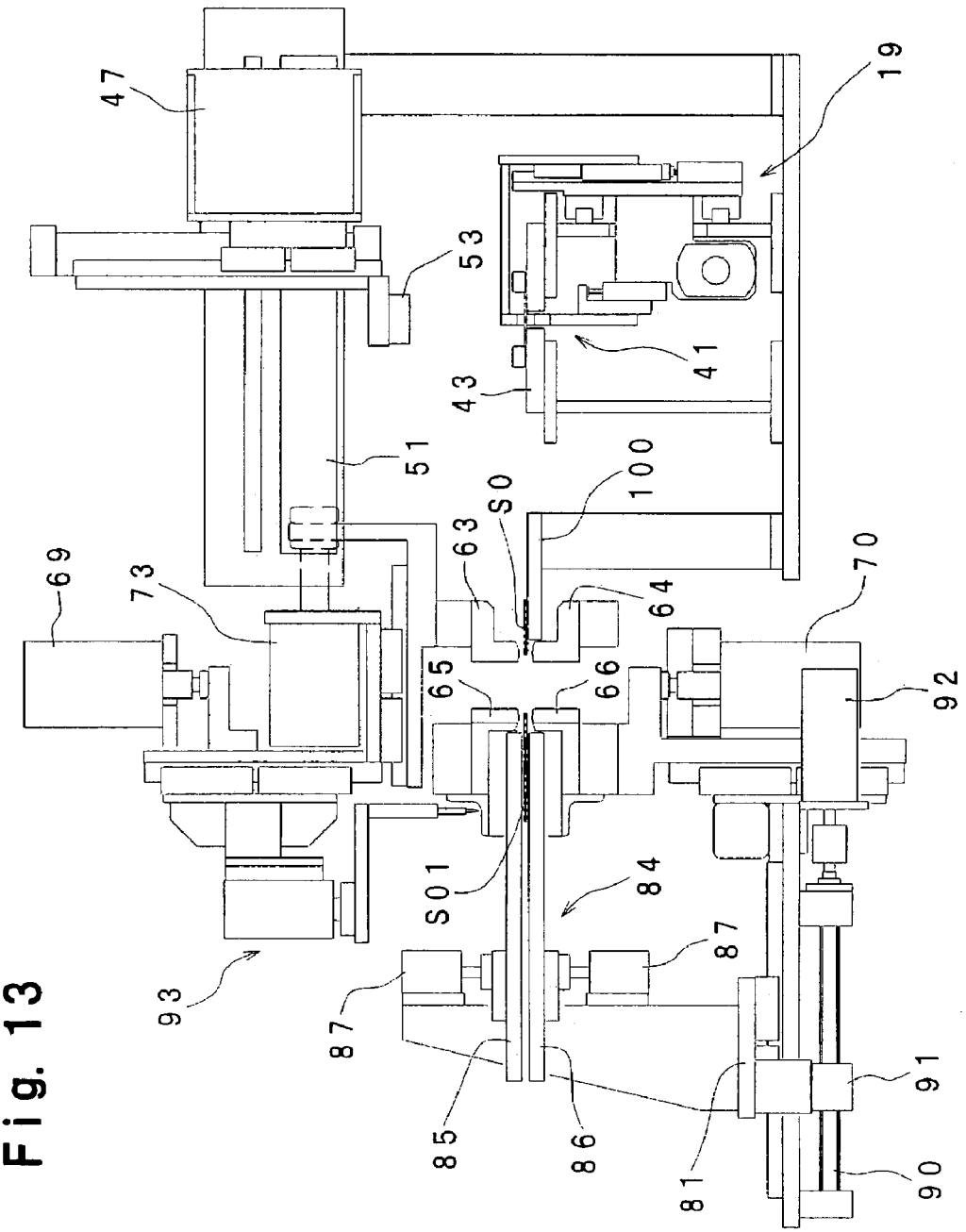

FIG. 12 is a view showing an operation state of the apparatus shown in FIG. 3, where the piercing treatment is performed, and the overlapped and joined sheet is supplied to the sheet joining position; and FIG. 13 is a view showing an operation state of the apparatus shown in FIG. 3, where the adsorbing head is at the upper position, and the first and second holding members are at the start position.

DETAILED DESCRIPTION OF THE PREFERRED EMBODIMENT

Figure 2:
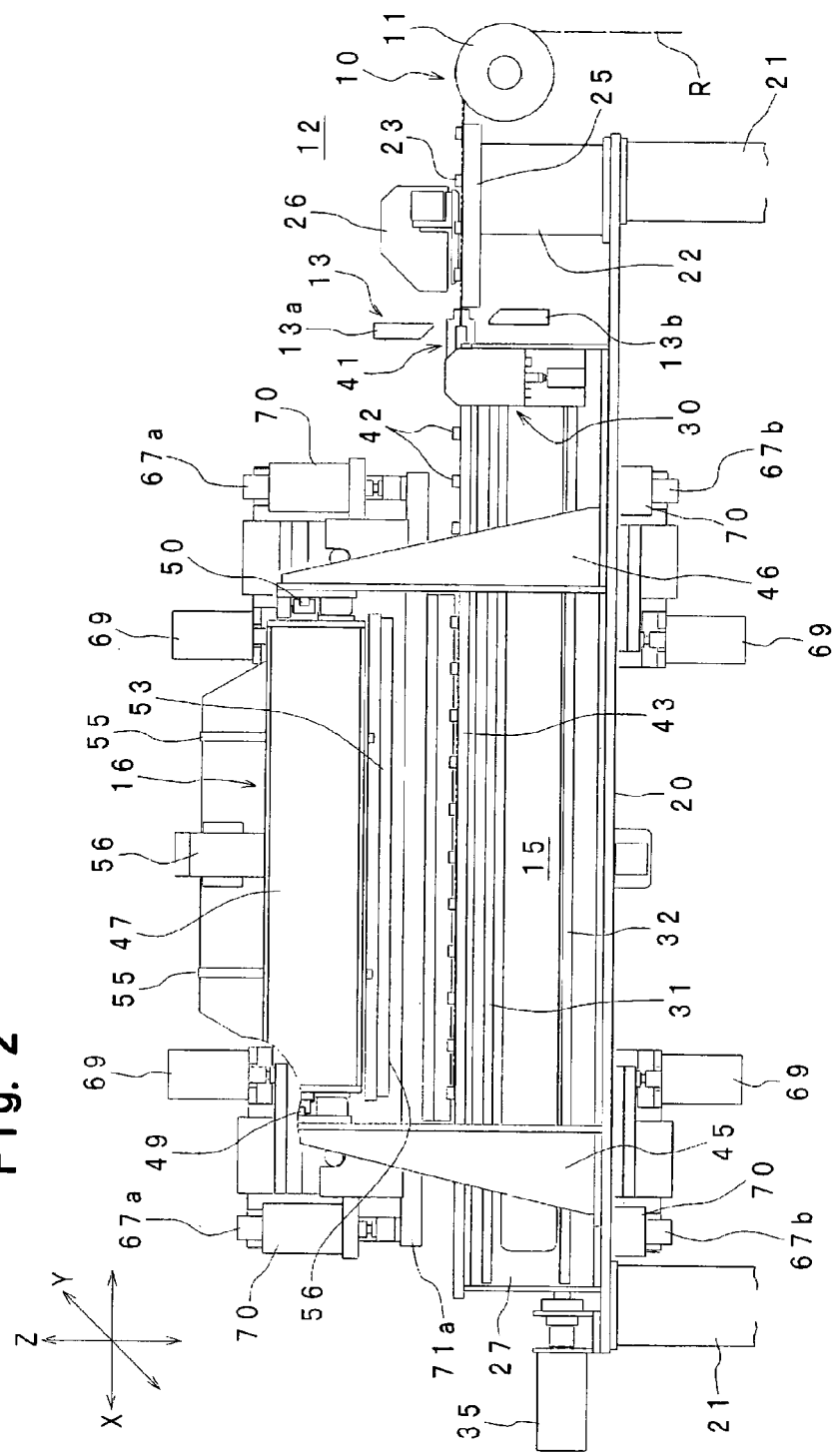
FIG. 2 is a front view illustrating a rubber sheet joining apparatus as viewed in the direction of an arrow 2 in FIG. 1.

Hereinafter, a preferred embodiment of a rubber sheet joining apparatus and method according to the present invention will be described with reference to the drawings. For the convenience in description, an up-down direction, a left-right horizontal direction, and a front-rear horizontal direction in FIG. 2 are referred to as Z-axis direction, X-axis direction, and Y-axis direction, respectively. In order to facilitate the understanding of the present invention, in the following description, one rubber sheet strip having long length is referred to as S1, one rubber sheet strip having short length is referred to as S2, a thing having this two kinds of rubber sheet strips S1 and S2 overlapped and joined with each other is referred to as an overlapped and joined strip S0, and a thing having plural overlapped and joined strips S0 joined at side surfaces thereof is referred to as a ply sheet S01.

Figure 1:
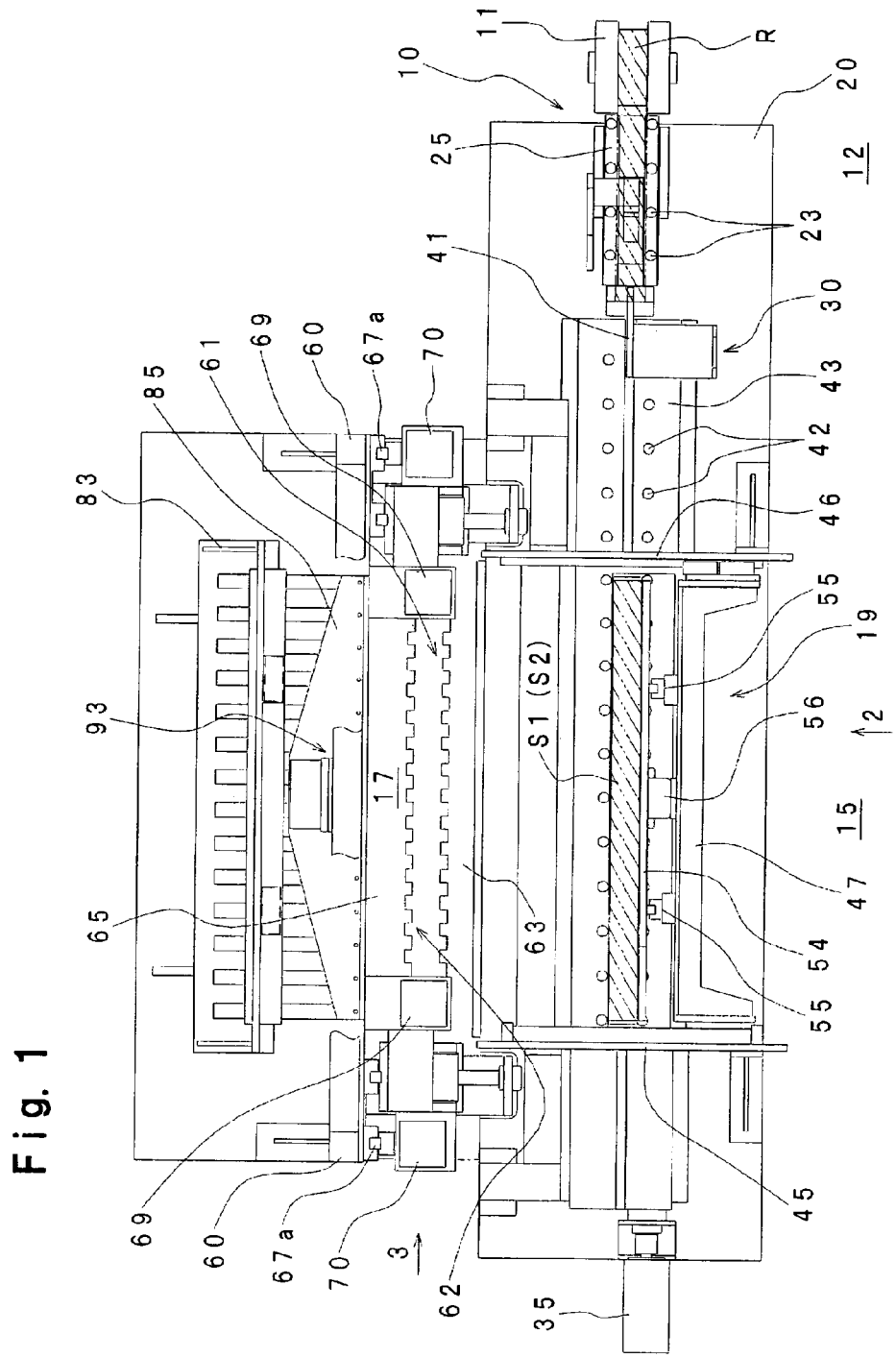
FIG. 1 is a plan view illustrating an embodiment of a rubber sheet joining apparatus according to the present invention.

As shown in FIG. 1 through FIG. 3, reference numeral 10 represents a sheet supply device for supplying a sheet supply position 12 with a ribbon of rubber sheet reinforced with cords S (hereinafter referred to as ribbon R) having a certain width which is fed by feeding roller 11 from a bobbin B which will be described later. A cutter 13 as a cutting unit is arranged in the sheet supply position 12. The cutter 13 cuts the ribbon R having the certain width in different lengths to make rubber sheet strips having different lengths corresponding to a width of a body ply determined by factors such as kind or size of a tire. A sheet overlapping unit 16 is arranged at a sheet overlapping position 15 which is apart from the sheet supply position 12 by a certain distance in the X-axis direction. The sheet overlapping unit 16 overlaps and joins two kinds of the rubber sheet strips S1 and S2 having different lengths. Also, a strip side surfaces joining unit 18 is arranged at a sheet joining position 17 which is apart from the sheet overlapping position 15 by a certain distance in the Y-axis direction. The strip side surfaces joining unit 18 butt-joins the side surfaces of two overlapped and joined strips S0. A sheet conveying device 19 is arranged between the sheet supply position 12 and the sheet overlapping position 15. The sheet overlapping unit 16 transfers the overlapped and joined strip S0 from the sheet overlapping position 15 to the sheet joining position 17.

Reference numeral 20 represents a fixed base which is horizontally mounted across the sheet supply position 12, the sheet overlapping position 15, and the sheet joining position 17. The fixed base 20 is supported on the floor surface through plural leg portions 21 thereof. In the sheet supply position 12, a support rack 22 is arranged on the fixed base 20, and a ribbon guide rack 25 is arranged on the support rack 22. A pair of roller guides 23 allows the ribbon guide rack 25 to slidably guide the ribbon R in the X-axis direction. The cutter 13 is arranged on the fixed base 20, and the cutter 13 includes an upper blade 13a and a lower blade 13b which cut the ribbon R in a certain length. Reference numeral 26 represents a ribbon pressing jig pressing the ribbon R on the ribbon guide rack 25, during cutting the ribbon R.

In a support rack 27 mounted on the fixed base 20, a pair of linear guides 31 and 32 which are apart from each other in the up and down direction allows a conveying member 30 to be slidably supported in the X-axis direction. A ball nut 33 is attached to the conveying member 30, and a ball screw shaft 34, which is screw-engaged with the ball nut 33, is rotatably supported along the X-axis direction on the fixed base 20. One end of the ball screw shaft 34 is connected to a servomotor 35 for conveyance, and the servomotor 35 is attached to the fixed base 20. A rotation of the servomotor 35 for conveyance slides the conveying member 30 along the linear guides 31 and 32 through a ball screw mechanism which includes the ball screw shaft 34 and the ball nut 33. A chuck device 41, which includes an upper chuck 38 and a lower chuck 40, is supported on the conveying member 30. The upper chuck 38 is moved in the up and down direction by a cylinder device 37, and the lower chuck 40 is moved in the up and down direction by a cylinder device 39. As a result, when the upper chuck 38 and the lower chuck 40 are closely moved with each other, the chuck device 41 can grip (keep) an end portion of the ribbon R supplied to the ribbon guide rack 25. The sheet conveying device 19 includes the conveying member 30, the servomotor 35 for conveyance, the ball screw mechanism (33 and 34), etc.

The chuck device 41 grips the end portion of the ribbon R supplied on the ribbon guide rack 25. In this state, the conveying member 30 is moved by the servomotor 35 along the linear guides 31 and 32 for conveyance, so that the ribbon R is drawn in a certain length corresponding to the lengths of the rubber sheet strips S1 and S2. Then, the cutter 13 cuts the ribbon R to make the rubber sheet strips S1 and S2 having different lengths.

The sheet overlapping position 15 is provided with a sheet guide rack 43. The sheet guide rack 43 slidably guides the rubber sheet strips S1 and S2 in the X-axis direction by a pair of roller guides 42. The sheet guide rack 43 is aligned with the ribbon guide rack 25 in the X-axis direction and the Z-axis direction. A pair of support frames 45 and 46, which are apart from each other by a certain distance in the X-axis direction, stand between the sheet overlapping position 15 and the sheet joining position 17. Linear guides 49 and 50 fixed to the support frames 45 and 46 slidably support a transfer member 47 between the support frames 45 and 46, and the transfer member 47 is moved by a cylinder 51 for transferring in the Y-axis direction. A slider 54 is mounted on the transfer member 47 and guided along a pair of linear guides 55 to be moved by a cylinder 56 up and down. And, the slider 54 is provided with an adsorbing head 53 in lower end thereof. The absorbing head 53 is as long as, or longer than the rubber sheet strip S2. The lower surface of the absorbing head 53 is provided with an absorbing surface 53a which absorbs the rubber sheet strip S2 by the vacuum. Therefore, the absorbing surface 53a of the absorbing head 53 can absorb the rubber sheet strip S2 through the entire length. Furthermore, the transfer member 47 is slidable to transfer the overlapped and joined strip S0 from the sheet overlapping position 15 to the sheet joining position 17. The sheet overlapping unit 16 includes the absorbing head 53, the slider 54, the cylinder 56 for moving the slider 54 up and down, etc.

The sheet joining position 17 is provided with a fixed frame 60, and the fixed frame 60 is provided with a first holding unit 61 and a second holding unit 62. The first holding unit 61 holds a front end of a following overlapped and joined strip S0. The first holding unit 61 is moved in the horizontal Y-axis direction relative to the second holding unit 62, and the second holding unit 62 holds a rear end of a preceding overlapped and joined strip S0.

The first holding unit 61 has a pair of first holding members 63 and 64 which can move close to and away from each other in the up and down direction (Z-axis direction). The second holding unit 62 has a pair of second holding members 65 and 66 which can move close to and away from each other in the Z-axis direction. The holding members 63, 65 and the holding members 64, 66 are attached to sliders 68a and 68b. The sliders 68a and 68b are guided to be movable in the Z-axis direction by an upper linear guide 67a and a lower linear guide 67b which are arranged along the Z-axis direction. The sliders 68a and 68b are moved in the Z-axis direction by cylinders 69, 70 for sheet-holding, so that the first and second holding unit 61, 62 synchronize to open and to close.

The second holding members 65 and 66 of the second holding unit 62 are fixed to the sliders 68a and 68b respectively. Linear guides 72a and 72b are arranged to the sliders 68a and 68, respectively. The Linear guides 72a and 72b guide slider members 71a and 71b, to which the first holding members 63 and 64 of the first holding unit 61 are attached. Thus, the first holding members 63 and 64 are guided to be movable in the Y-axis direction by the linear guides 72a and 72b. The first holding members 63 and 64 are integrally moved in the Y-axis direction by a cylinder 73 for shift. The sliders 68a and 68b, the linear guides 72a, 72b and the slider members 71a, 71b, etc. constitute support guides, and the cylinder 73 for shift, etc. constitute an operating unit in the present invention.

The first holding members 63 and 64 and the second holding members 65 and 66 are synchronized with each other by the cylinders 69 and 70 for sheet-holding, so that the first and second holding unit 61 and 62 open and close in the Z-axis direction (in the up and down direction). And, the first holding members 63, 64 are relatively moved close to and away from the second holding members 65, 66 in the Y-axis direction by the cylinder 73 for shift. The strip side surface butt-joining unit 18 includes the first holding members 63 and 64, the second holding members 65 and 66, the cylinders 69 and 70 for sheet-holding, the cylinder 73 for shift, etc. Reference number 100 shown in FIG. 3 represents support rack which supports the overlapped and joined strip S0 that is absorbed and supplied to the sheet joining position 17 by the absorbing head 53.

Figure 4:
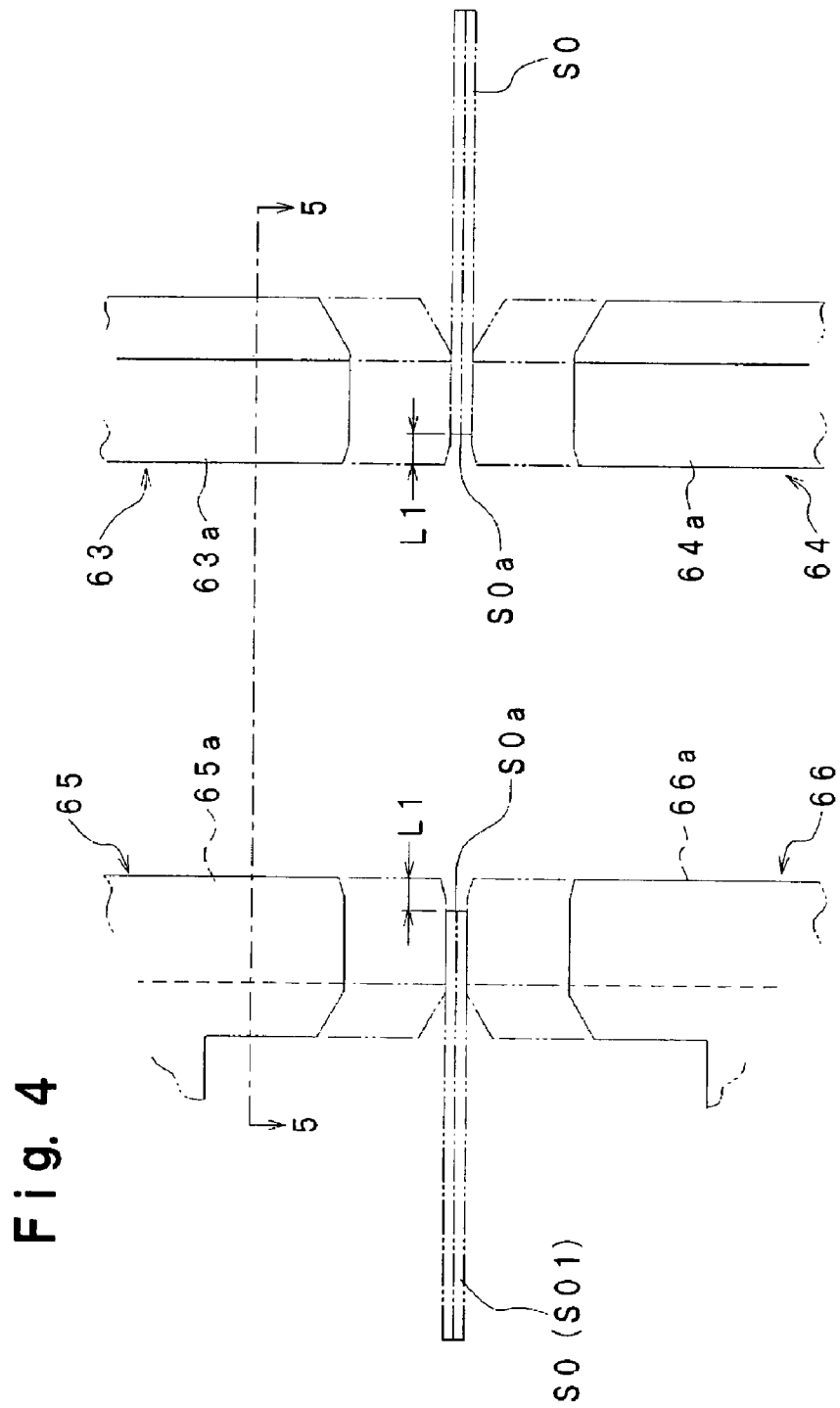
FIG. 4 is a view illustrating a sheet holding portion enlarging a portion in FIG. 3.
Figure 5:
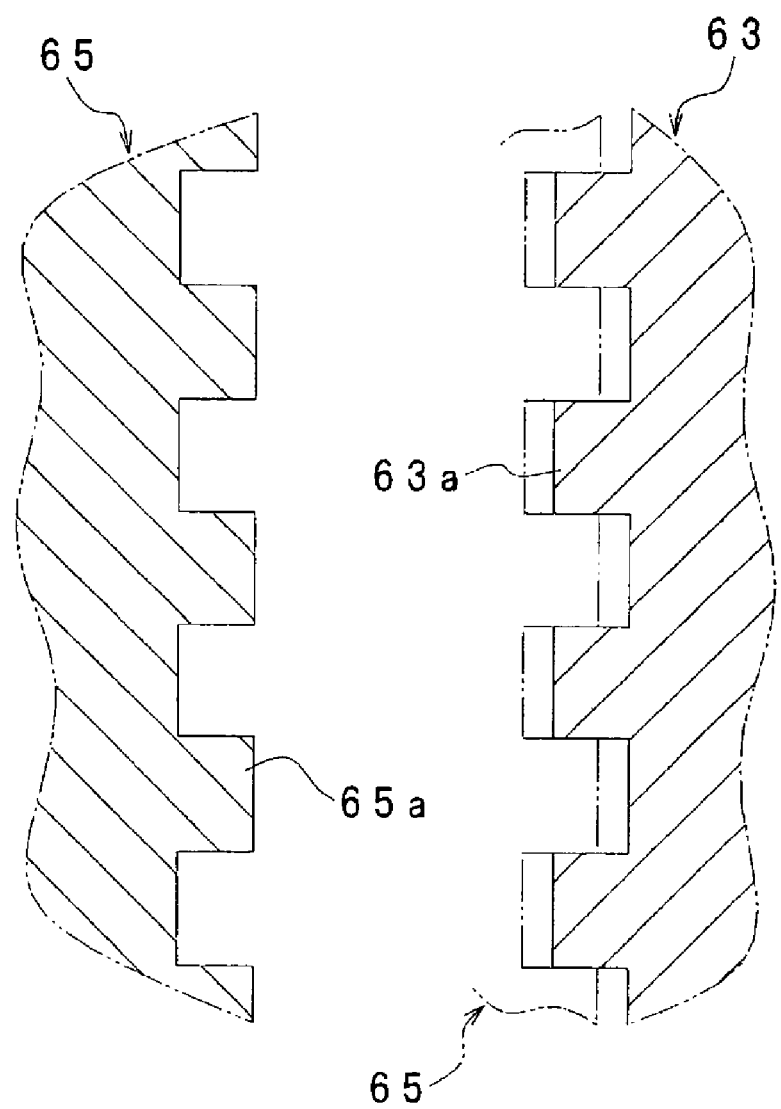
FIG. 5 is a cut view taken along the line 5-5 in FIG. 4.

As shown in FIG. 4 and FIG. 5 in detail, concave-convex portions 63a and 64a of a comb-tooth shape are formed by a certain depth at both left end portions of the first holding members 63 and 64. The front end portion of the following overlapped and joined strip S0 is held between the comb-tooth shape portions with the upper and lower surfaces thereof being pinched therebetween. The first holding members 63 and 64 hold the front end portion of the following overlapped and joined strip S0 at a certain position where the front side surface S0a of the following overlapped and joined strip S0 retracts from the left end surface of the concave-convex portions 63a and 64a by a distance L1.

As shown in FIG. 4 and FIG. 5 in detail, concave-convex portions 65a and 66a of a comb-tooth shape are formed by a certain depth at both right end portions of the second holding members 65 and 66. The rear end portion of the preceding overlapped and joined strip S0 is held between the comb-tooth shape portions with the upper and lower surfaces being pinched therebetween. The second holding members 65 and 66 hold the rear end portion of the preceding overlapped and joined strip S0 at a certain position where the rear side surface S0a of the preceding overlapped and joined strip S0 retracts from the right end surface of the concave-convex portions 65a and 66a by a distance L1.

Both lengths along the X-axis direction of the first holding members 63 and 64 and the second holding members 65 and 66 are longer than the length LB1 of the rubber sheet strip S1. When the first holding members 63 and 64 and the second holding members 65 and 66 are respectively moved close to each other by the cylinder 69 and 70 for sheet-holding, the overlapped and joined strips S0 are held in the entire length by the respective comb-tooth shape portions.

The concave-convex portions 63a and 64 and concave-convex portions 65a and 66a of the comb-tooth shape are so formed that the concave-convex portions 63a and 64a and concave-convex portions 65a and 66a can be meshed with each other and, the first holding members 63 and 64 and the second holding members 65 and 66 can be overlapped by meshing the concave-convex portions 63a, 64a and 65a, 66a with each other.

On a fixed base 80, there is provided with a linear guide 82 for guiding a moving rack 81 to move in the Y-axis direction. A vertical frame 83 mounted on the moving rack 81 is provided with a feeding unit 84 for holding and feeding the ply sheet S01 by a certain distance.

The feeding unit 84 has a pair of third holding members 85 and 86 which can move close to and away from each other in the up and down direction. The pair of third holding members 85 and 86 are connected to cylinders 87 and 88 for opening and closing which are mounted to the vertical frame 83 respectively. The third holding members 85 and 86 are opened and closed in the up and down direction (in the Z-axis direction) by the cylinders 87 and 88 for opening and closing. Rear end portions of the third holding members 85 and 86 extends to a position where the ply sheet S01 can be delivered from the second holding members 65 and 66 to the third holding members 85 and 86.

A ball screw shaft 90 is supported under the fixed base 80 to be rotatable about an axis parallel to the Y-axis direction and is screw-engaged with a ball nut 91 fixed the lower surface of the moving rack 81. The ball screw shaft 90 is connected to a motor shaft of a servomotor 92 for feeding that is mounted on the fixed base 80. The moving rack 81 is controllably moved through a ball screw mechanism which includes the ball screw shaft 90 and the ball nut 91, by rotation of the servomotor 92 for feeding.

On the fixed frame 60, a piercing device 93 is arranged at an upper position a little away from the second holding members 65 and 66 in the Y-axis direction. The piercing device 93 has a needle member supporting block 95 which is movable in the up and down direction (in the Z-axis direction) by a cylinder 94 for piercing. Many needles 96 are set up on the under surface of the needle member supporting block 95 in a row in the X-axis direction. Many needle holes (not shown in FIG. 3) through which the needles 96 go up and down are formed through the third holding members 85 and 86. Many through holes for extracting air are formed by the needles 96 through the ply sheet S01 which is held on the third holding members 85 and 86.

Figure 7:
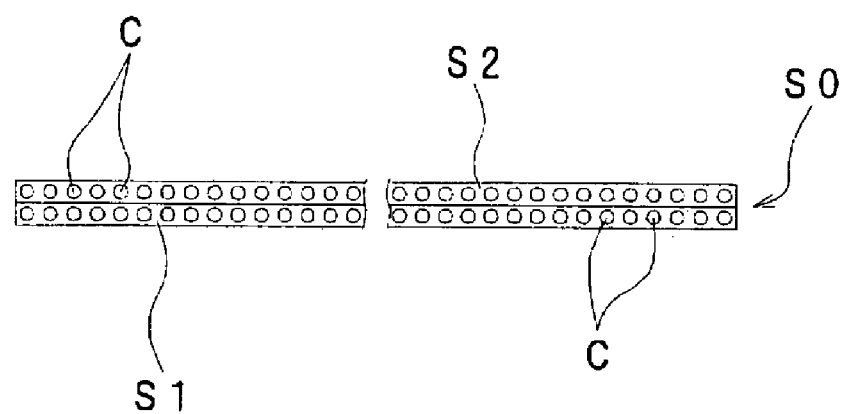
FIG. 7 is a view illustrating a state overlapping rubber sheets having different lengths.
Figure 8:
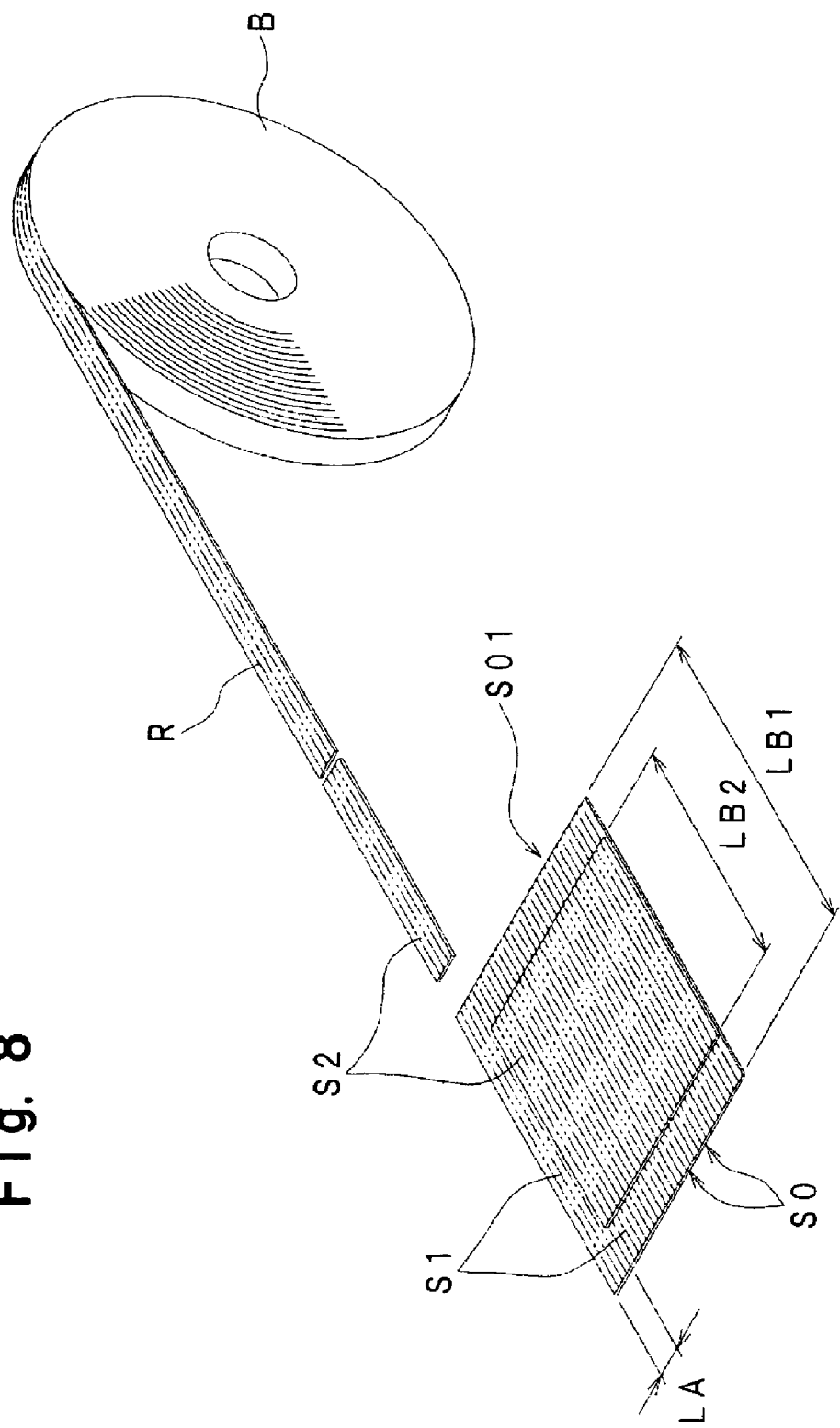
FIG. 8 is a view illustrating a state of overlapping and joining strips S2 to strips S1.

As shown in FIG. 8, the rubber sheet strips S1 and S2 are made by cutting the ribbon R having relatively narrow width LA which is wounded around a bobbin B to make a roll. The rubber sheet strips having different lengths, whose lengths LB1 and LB2 (LB1>LB2) correspond to a width of a body ply determined by factors such as kind and size of a tire. The cutting is performed at a right angle to the ribbon R. The ribbon R is so constituted that many cords C for reinforcement extending in the longitudinal direction of the ribbon R are placed in a row and embedded therein. When the rubber sheet strips S1 and S2 of different lengths LB1 and LB2 are overlapped and joined, as shown in FIG. 7, the cords C are placed in a row in both directions in a cross section of the rubber sheet strips S1 and S2, that is, the cords are aligned with each other both in the width direction (in the left and right direction in FIG. 7) of the ribbon R and in the up and down direction.

Figure 6:
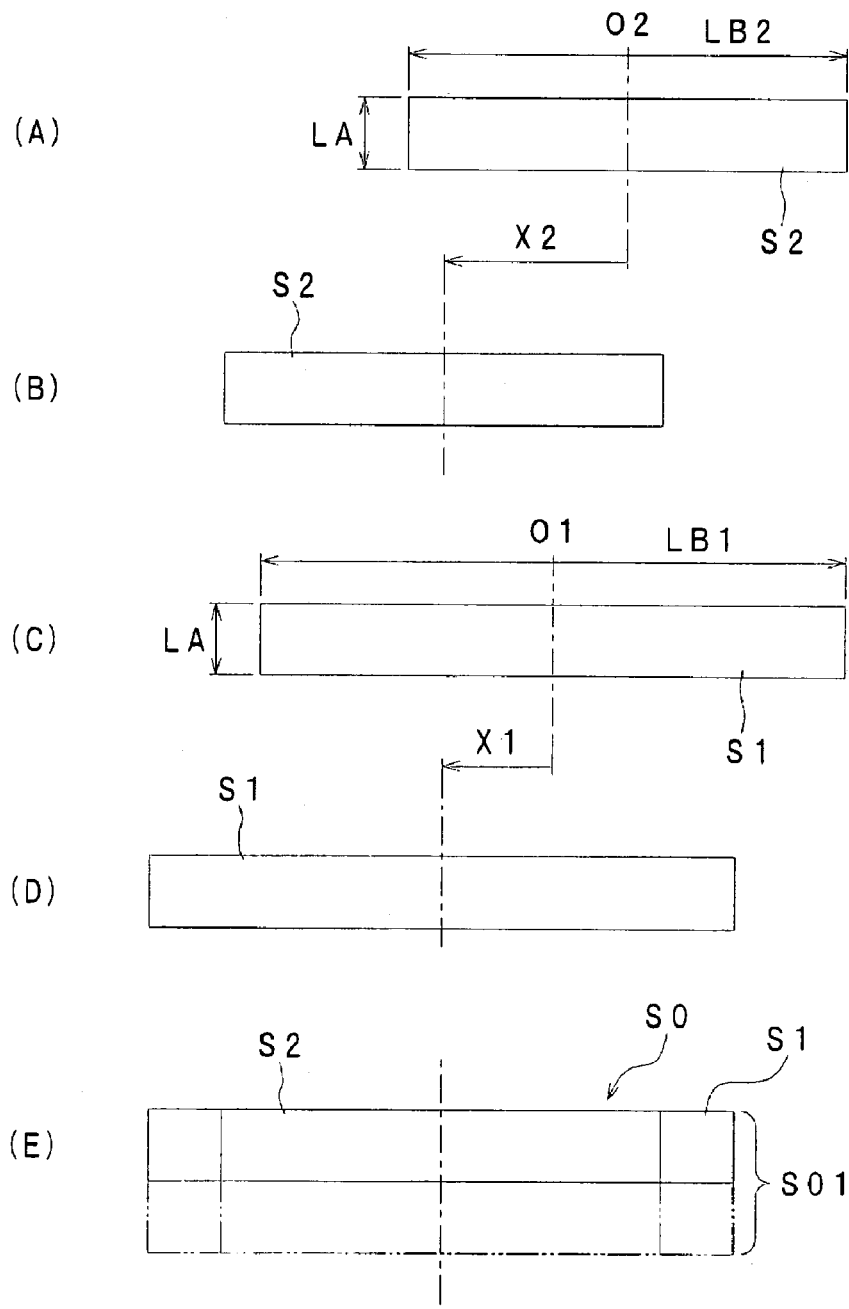
FIG. 6A to FIG. 6E is an explanatory view illustrating the order of overlapping rubber sheets having different lengths.

Hereinafter, the operation of the present embodiment constituted as described above will be described. First, as shown in FIG. 2 and FIG. 3, when the end portion of the ribbon R having certain width LA is gripped by the chuck device 41, the conveying member 30 is moved in the X-axis direction by the servomotor 35 for conveyance with being guided by the linear guides 31 and 32. Rotational amount of the servomotor 35 for conveyance is controlled so that feeding amount of the ribbon R becomes the certain length LB2. When the ribbon R is fed by the certain length LB2, the servomotor 35 for conveyance is stopped. Thereafter, the ribbon pressing jig 26 is operated and the ribbon R is pressed against the ribbon guide rack 25. At this state, the cutter 13 is operated, so that the ribbon R is cut. Thus, as shown in FIG. 6A, the rubber sheet strip S2 having the short length LB2 is made. After the rubber sheet strip S2 is cut in the certain length LB2, the servomotor 35 for conveyance is controlled again, and thereby the rubber sheet strip S2 is conveyed on the sheet guide rack 43 by distance X2 so that the rubber sheet strip S2 is positioned in a position where the center O2 in the longitudinal direction of the rubber sheet strip S2 is aligned to the center of the absorbing head 53 (refer to FIG. 6B).

Figure 9:
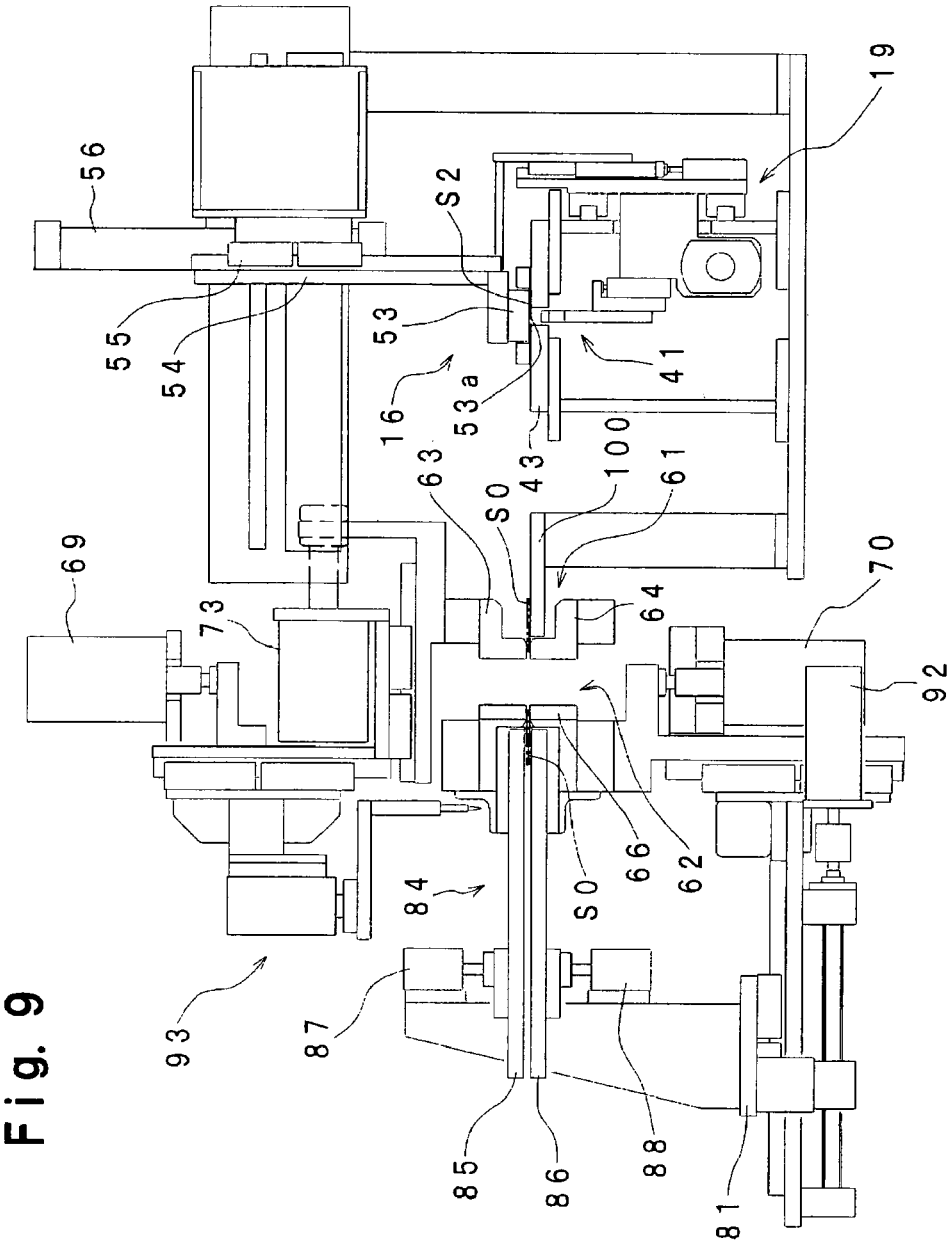
FIG. 9 is a view showing an operation state of the apparatus shown in FIG. 3, where the rubber sheet strip S2 is just absorbed, and two overlapped and joined strips are held by first and second holding members.
Figure 10:
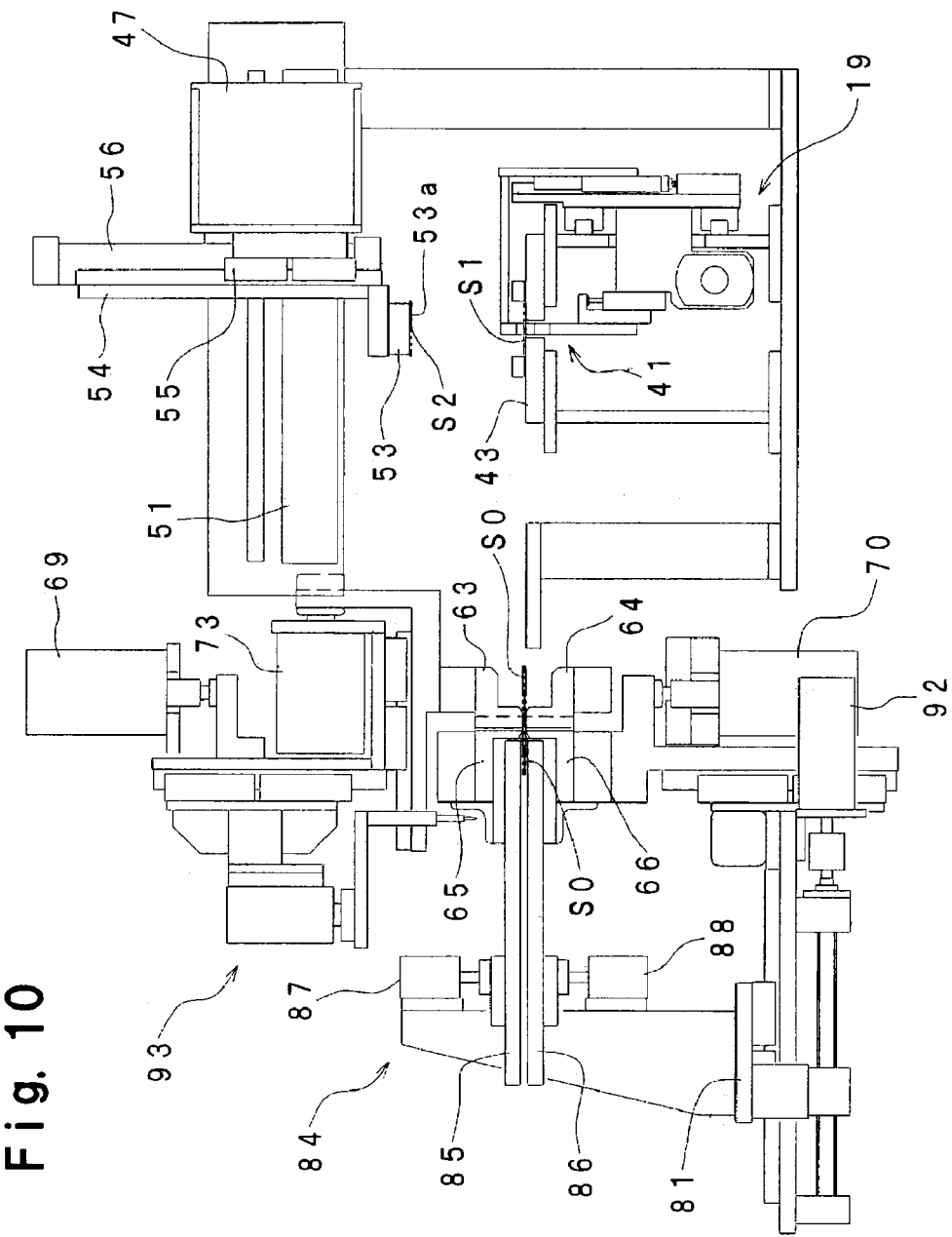
FIG. 10 is a view showing an operation state of the apparatus shown in FIG. 3, where the rubber sheet strip S1 is positioned under the rubber sheet strip S2, and the two overlapped and joined strips are butt-joined.

Next, as shown in FIG. 9, after the chuck device 41 is opened and is returned to a chuck position, the absorbing head 53 is moved down by the cylinder 56 for ascending and descending. Then, the absorbing head 53 absorbs by the vacuum the rubber sheet strip S2 having the length LB2 positioned on the sheet guide rack 43 on the absorbing surface 53a of the absorbing head 53. Thereafter, as shown in FIG. 10, the absorbing head 53 is moved up by the cylinder 56 for ascending and descending, and the rubber sheet strip S2 is kept being held in a state where it is absorbed by the absorbing head 53.

Subsequently, in the sheet supply position 12, in the same manner as described above, the end of the ribbon R is gripped by the chuck device 41, and the chuck device 41 is moved again along the linear guide 31 and 32 by the servomotor 35 for conveyance. The rotational amount of the servomotor 35 for conveyance in this time is so controlled that the feeding amount of the ribbon R is the certain length LB1 longer than the certain length LB2 by a certain amount. In this state, in the same manner as described above, the cutter 13 is operated as shown in FIG. 6C, so that the rubber sheet strip S1 having the long length LB1 is made. When the rubber sheet strip S1 is cut in the certain length LB1, the servomotor 35 for conveyance is controlled again, and the rubber sheet strip S1 is positioned in a position where the center O1 in the longitudinal direction of the rubber sheet strip S1 is aligned to the center of the absorbing head 53 (refer to FIG. 6D).

That is, a conveying distance X1 of the rubber sheet strip S1 having the length LB1 by the servomotor 35 for conveyance in this time is shorter than a conveying distance X2 of the rubber sheet strip S2 having the length LB2 by the distance equal to the half of the length difference between the rubber sheet strips S1 and S2.

Figure 11:
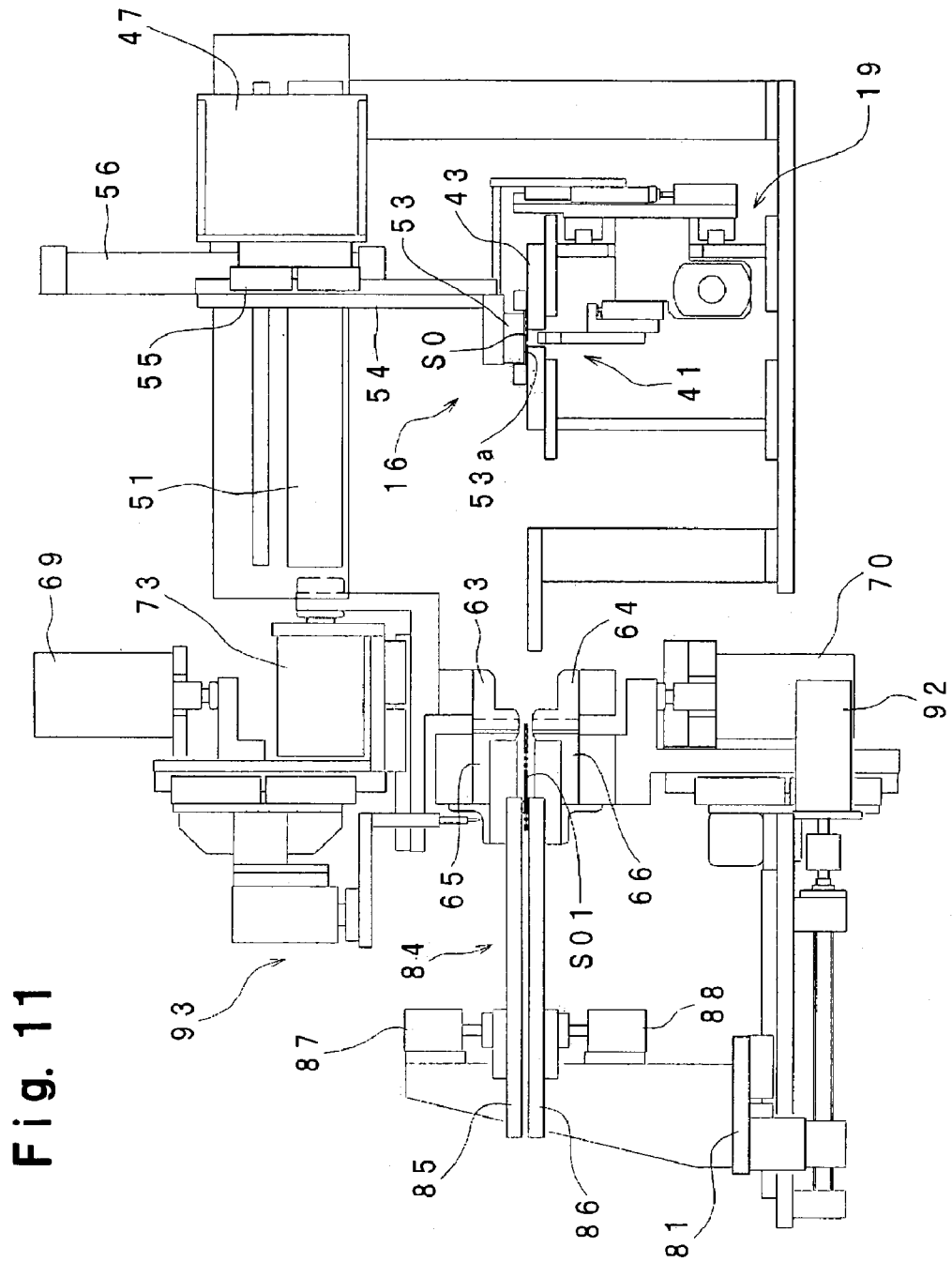
FIG. 11 is a view showing an operation state of the apparatus shown in FIG. 3, where rubber sheets S1 and S2 are overlapped and joined together, and the ply sheet is moved by a certain distance.

Thus, the rubber sheet strip S1 having the long length LB1 is positioned under the rubber sheet strip S2 having the short length LB2 (refer to FIG. 10), and as shown in FIG. 11, the absorbing head 53 absorbing the rubber sheet strip S2 having the short length LB2 is moved down by the cylinder 56 for ascending and descending, so that the rubber sheet strip S2 having the short length is overlapped, pressed and joined to the rubber sheet strip S1 having the long length so as to make the overlapped and joined strip S0. That is, as shown in FIG. 6E, the centers O1 and O2 of the rubber sheet strips S1 and S2 having different length are aligned with each other, and the two rubber sheet strips S1 and S2 are overlapped and joined to make the overlapped and joined strip S0. In this state, as shown in FIG. 7, the cords C are aligned with each other both in the width direction (in the left and right direction in FIG. 7) of the ribbon R and in the up and down direction.

In the sheet joining position 17, while the rubber sheet strips S1 and S2 are cut and are overlapped and joined, a process for butt-joining the side surfaces of two overlapped and joined strips S0 is performed at the same time as described later. The process for butt-joining the side surfaces of the overlapped and joined strips S0 is terminated before the process for overlapping and joining the rubber sheet strips S1 and S2 is completed.

As described above, the overlapped and joined strip S0 is absorbed to the absorbing surface 53a and moved up by the absorbing head 53, and then is transferred from the sheet overlapping position 15 to the sheet joining position 17 by the cylinder 51 for transferring, and are supplied on the support rack 100 at the sheet joining position 17, as shown in FIG. 12. Thereafter, the absorbing head 53 is returned to an original position shown in FIG. 13 by operations of the cylinder 56 for ascending and descending and the cylinder 51 for transferring.

After the overlapped and joined strip S0 is supplied to the support rack 100 at the sheet joining position 17 and the absorbing head 53 is returned to the original position, the first holding members 63 and 64 is returned to a position where they hold the front end of the following overlapped and joined strip S0 by the cylinder 73 for shift, as shown in FIG. 3. In this state, two cylinders 69 and 70 for sheet-holding are operated, so that the first holding members 63 and 64 and the second holding members 65 and 66 are moved in the Z-axis direction, wherein the first holding members 63 and 64 and the second holding members 65 and 66 approach with each other. Accordingly, the first holding members 63 and 64 hold the front end of the following overlapped and joined strip S0 supplied on the support rack 100, and the second holding members 65 and 66 hold the rear end of the preceding overlapped and joined strip S0 that is held in the third holding members 85 and 86 (state in FIG. 9).

Therefore, as shown in FIG. 4, the following overlapped and joined strip S0 is held by the first holding members 63 and 64 at the certain position where the front side surface S0a retracts by the distance L1 from the left end surface of the concave-convex portion 63a and 64a of the comb-tooth shape. Also, the preceding overlapped and joined strip S0 is held by the second holding members 65 and 66 at the certain position where the rear side surface S0a of the preceding overlapped and joined strip S0 retracts by the distance L1 from the right end surface of the concave-convex portion 65a and 66a of the comb-tooth shape.

Since there is no overlapped and joined strip S0 between the third holding members 85 and 86 when the initial overlapped and joined strip S0 is supplied on the support rack 100, the moving rack 81 is controlled to move so that the third holding members 85 and 86 directly hold the front end of the initial overlapped and joined strip S0 supplied on the support rack 100 at the sheet joining position 17 through widely opened the first and second holding members 63, 64 and 65, 66.

As shown in FIG. 9, two overlapped and joined strips S0 are held between the first holding members 63 and 64 and the second holding members 65 and 66, respectively, and the third holding members 85 and 86 are opened by the cylinders 87 and 88 for opening and closing. Then, as shown in FIG. 10, the first holding members 63 and 64 are moved toward the second holding members 65 and 66 in the Y-axis direction by the cylinder 73 for shift. Accordingly, the concave-convex portions 63a and 64a of the comb-tooth shape formed at the left end portion of the first holding members 63 and 64 are meshed with the concave-convex portions 66a and 65a of the comb-tooth shape formed at the right end portion of the second holding members 65 and 66. In this way, when the concave-convex portions 63a and 64a of the first holding members 63 and 64 are moved into the concave-convex portions 65a and 66a of the second holding members 65 and 66 by a certain depth, the front side surface S0a of the following overlapped and joined strip S0 held (pinched) by the first holding members 63 and 64 is pressed against the rear side surface S0a of the preceding overlapped and joined strip S0 held (pinched) by the second holding members 65 and 66 to be butt-joined together.

A stroke end of the cylinder 73 for shift is so set that the following overlapped and joined strips S0 is moved relative to the preceding overlapped and joined strips S0 by a certain amount ΔL (e.g., 1 mm or so) after both end surfaces are just contact with each other. That is, the concave-convex portions 63a and 64a of the first holding members 63 and 64 are overlapped with the concave-convex portions 65a and 66a of the second holding members 65 and 66 to mesh with each other by the depth of 2L1+ΔL. Thus, in the state where the front and rear end portions of the overlapped and joined strips S0 are firmly held, the front side surface S0a can be pressed against the rear side surface with strong butt-joining force. Moreover, it is prevented that a bulge portion is generated at the joint portion where the side surfaces of two overlapped and joined strips S0 are butt-joined because the upper and lower surfaces of two overlapped and joined strips S0 are held between the first holding members 63 and 64 and the second holding members 65 and 66. Thus, two overlapped and joined strips S0 are butt-joined reliably to generate the ply sheet S01.

In this way, the cylinder 73 for shift is operated to the stroke end, so that the side surfaces S0a of two successive overlapped and joined strips S0 are pressed against each other and butt-joined, and thereafter the third holding members 85 and 86 are moved close to each other by the cylinders 87 and 88 for opening and closing so as to hold the ply sheet S01 to which the following overlapped and joined strips S0 is butt-joined. Next, the cylinders 69 and 70 for sheet-holding are operated, so that the first holding members 63 and 64 and the second holding members 65 and 66 are moved away from each other to release the ply sheet S01 (state in FIG. 11).

After the first holding members 63 and 64 and the second holding members 65 and 66 release the ply sheet S01 (the successive overlapped and joined strips S0), the servomotor 92 for feeding is operated to retract the moving rack 81 and the third holding members 85 and 86 in the Y-axis direction by a certain distance LA−ΔL. The certain distance LA−ΔL corresponds to the width LA of the overlapped and joined strip S0 and the certain amount ΔL. Thus, as shown in FIG. 11, the ply sheet S01 held by the third holding members 85 and 86 is moved in the X-axis direction by the certain distance LA−ΔL to the position where a new rear side surface of the ply sheet S01 retracts from the right end surface of the concave-convex portions 65a and 66a of the second holding members 65 and 66 (refer to FIG. 4).

And, when the next following overlapped and joined strip S0 is supplied to the support rack 100 as shown in FIG. 12, the cylinder 73 for shift shifts the first holding members 63 and 64 away from the second holding members 65 and 66 as shown in FIG. 13. Thus, the first holding members 63 and 64 are returned to a position where they can hold the front end of the following overlapped and joined strip S0 supplied on the support rack 100. In concurrence with this operation, as shown in FIG. 12, the needle member supporting block 95 of the piercing device 93 is moved down by the cylinder 94 for piercing, so that the piercing treatment is performed through the ply sheet S01 which is held between the third holding members 85 and 86 by the plural needle members 96. Thus, the plural through holes are formed through the ply sheet S01 to extract air interposed between the rubber sheet strips S1 and S2.

Since the piercing treatment can be performed concurrently with a series of processes for joining the rubber sheet strips, additional time for the piercing treatment can be eliminated. Further, since the rubber sheet strips having different lengths are cut, overlapped and joined regularly, the cords C of the rubber sheet strips S1 and S2 having different length can be aligned in the up and down direction, as shown in FIG. 7. Accordingly, since the piercing can be performed between the cords C, the piercing treatment is performed without damaging the cords C.

Thereafter, the first holding members 63 and 64 hold the front end of the following overlapped and joined strip S0 supplied to the support rack 100, and the second holding members 65 and 66 hold the rear end of the preceding overlapped and joined strip S0 just abut-joined to the ply sheet S01. The third holding members 85 and 86 are moved away from each other by the cylinders 87 and 88 for opening and closing so as to release the ply sheet S01. Then, the servomotor 92 for feeding is operated to move the moving rack 81 and the third holding members 85 and 86 close to the second holding members 65 and 66 in the Y-axis direction by the certain distance LA−ΔL.

Next, the first holding members 63 and 64 are moved in the Y-axis direction relative to the second holding members 65 and 66, so that the front side surface S0a of the following overlapped and joined strip S0 is pressed against and butt-joined to the rear end surface S0a of the ply sheet S01, as described above. As a result, the next following overlapped and joined strip S0 is butt-joined to the ply sheet S01.

In this way, the front side surface of the overlapped and joined strip S0 is butt-joined to the rear side surface of the ply sheet S01 in sequential order, by repeating the operations as described above. At the same time, the ply sheet S01 to which the following overlapped and joined strip S0 is just butt-joined is moved by the certain distance LA−ΔL in sequential order, by the feeding unit 84. The ply sheet S01 having a certain length N×(NA−ΔL), which corresponds to the length of the body ply for one tire is completed by butt-joining N overlapped and joined strips S0 together. The completed ply sheet S01 (body ply sheet) is drawn from the third holding members 85 and 86 by a sheet drawing unit (not shown). The completed ply sheet S01 is transferred to a tray, etc., and is conveyed to a tire forming drum.

The embodiment as described above is suitable for a many kinds of small quantity production. And, it dissolves a problem that it is difficult to keep inventory space or inventory control because the apparatus according to the embodiment is small and the manufacturing cost thereof is low. In addition, it is possible to manufacture the ply sheet S01 which is uniform in thickness on the circumference by butt-joining the overlapped and joined strips S0. The ply sheet S01 is preferable for extracting air through the through holes that are made without damaging the cords C during piercing process. Thus, when the ply sheet S01 is applied to the body ply for the tire, it is possible to prevent stress from concentrating on the width end portion of the body ply. Also, the tire that is good at uniformity can be manufactured.

In the above-mentioned embodiment, after the rubber sheet strips S1 and S2 having different lengths are overlapped and joined, the ribbon R is cut to get the rubber sheet strip S2 having the short length, and the rubber sheet strip S2 is kept being held in a state where it is absorbed by the absorbing head 53. Thereafter, the ribbon R is cut to get the rubber sheet strip S1 having the long length, and the rubber sheet strip S2 having the short length is overlapped and joined on the rubber sheet strip S1 having the long length. However, on the contrary to this, the rubber sheet strip S1 having the long length may be overlapped and joined on the rubber sheet strip S2 having the short length.

Also, in the above-mentioned embodiment, when the rubber sheet strips S1 and S2 having different length is overlapped and joined, the centers of the rubber sheet strips S1 and S2 in the longitudinal direction thereof are aligned with each other. However, the rubber sheet strip S2 may be set to the position where one end thereof is apart from one end of the rubber sheet strip S1 in the longitudinal direction thereof before the rubber sheet strips S1 and S2 having different lengths are overlapped and joined Further, in the above-mentioned embodiment, the rubber sheet strips S1 and S2 are made by cutting a ribbon of rubber sheet reinforced with the cords. However, the rubber sheet strips S1 and S2 may be made by cutting a ribbon of rubber sheet reinforced by dip cords, which is fed continuously. The ribbon of rubber sheet reinforced by dip cords is made such that plural dip cords that are dipped in rubber in the liquid state are arranged in a row and covered by rubber.

Finally, various features and many of the attendant advantages in the foregoing embodiments will be summarized as follows.

In the above-mentioned embodiment, the rubber sheet joining method comprises: cutting the ribbon of rubber sheet reinforced with cords S in different lengths LB1, LB2 to generate rubber sheet strips S1, S2 having different lengths; providing the rubber sheet strips S1, S2 having different lengths to a certain position 17 to overlap and join each other to make an overlapped and joined strip S0; and butt-joining the side surfaces S0a of the successive two overlapped and joined strips S0 to generate a ply sheet S01. Therefore, the rubber sheet strips S1, S2 having different lengths can be easily made, and the rubber sheet strips S1, S2 having different lengths can be overlapped and joined easily to make the overlapped and joined strip S0, and the overlapped and joined strips S0 are butt-joined at side surfaces S0a thereof to manufacture the ply sheet S01, by using a single manufacturing apparatus. As a result, it dissolves a problem that it is difficult to keep inventory space or inventory control. The method requires small facilities and small manufacturing cost compared to conventional method. Further, it is possible to manufacture the ply sheet S01 which is uniform in thickness on the circumference of body ply.

In the embodiment, the rubber sheet joining method is further comprises: feeding the ply sheet S01 by the certain distance LA−ΔL to a position where the rear end portion of the preceding overlapped and joined strip S0 just butt-joined to the ply sheet S01 is held by the second holding members 65, 66; and providing piercing treatment through the ply sheet S01 fed by the feeding, in addition to the first aspect of the present invention. Thus, it is possible to easily manufacture the ply sheets S01 which have different lengths corresponding to body plies of tires. Further, the overlapping and joining strips can be made concurrently with the piercing treatment.

In the embodiment, the piercing treatment can be effectively performed, since the piercing treatment is performed through the ply sheet S01 concurrently with the overlapping and joining.

By the rubber sheet joining apparatus in the above-mentioned embodiment, rubber sheet strips S1, S2 having different lengths can be easily made by the cutting unit 13, being overlapped and joined each other by the sheet overlapping unit 16, and the overlapped and joined strips S0 are butt-joined at side surfaces S0a thereof by the operating unit 73 that moves the first holding members 63, 64 relative to the second holding members 65, 66. As a result, it dissolves a problem that it is difficult to keep an inventory space or an inventory control. The rubber sheet joining apparatus requires the small installment space therefor and small manufacturing cost compared to conventional method. Further, it is possible to manufacture the ply sheet S01 which is uniform in thickness on the circumference of body ply.

In the embodiment, the rubber sheet joining apparatus further comprises the feeding unit 84 for feeding the ply sheet S01 by the certain distance LA−ΔL to the position where the rear end portion of the preceding overlapped and joined strip S0 just butt-joined to the ply sheet S01 is held by the second holding members 65 and 66; and the piercing unit 93 for performing piercing treatment through the ply sheet S01. Thus, it is possible to easily manufacture the ply sheets S01 which have different lengths corresponding to a body plies of a tires. Further, the manufacture of the ply sheet S01 can be performed concurrently with the piercing treatment.

In the embodiment of the rubber sheet joining apparatus, the strips S1 and S2 having different lengths are overlapped and joined by the sheet overlapping unit 16 such that the cords S embedded therein are aligned in a row both in width direction and up and down direction in a cross section of the overlapped and joined strip S0, and the piercing treatment is performed through the overlapped and joined strip S0 between the cords S. Thus, the cords S are not damaged during piercing treatment. As a result, a body ply of a low-profile tire can be made of the ply sheet manufactured by the rubber joining apparatus without lowering strength of the body ply by damaging the cords.

In the embodiment of the rubber sheet joining apparatus, concave-convex portions are formed at the first holding members and the second holding members, so that the first holding members and the second holding members can be overlapped with the concave-convex portions meshing with each other. Accordingly, respective end portions of two overlapped and joined strips can be firmly held, and thereby reliably butt-joined each other.

Obviously, numerous modifications and variations of the present invention are possible in light of the above teachings. It is therefore to be understood that within the scope of the appended claims, the present invention may be practiced otherwise than as specifically described herein.

What is claimed is:

1. A rubber sheet joining apparatus, comprising:
a cutting unit for cutting a ribbon of cords reinforced rubber sheet at a right angle to a longitudinal direction of the ribbon in different lengths to generate plural different rubber sheet strips having different lengths, one of the plural different rubber sheet strips having a length corresponding to a width of a body ply of a tire, the cords extending in the longitudinal direction of the ribbon;
a sheet overlaying unit for providing the rubber sheet strips having different lengths made by the cutting unit to a certain position to stack and join the plural different rubber sheet strips having different lengths to make a stacked and joined strip in which the centers of the plural different rubber sheet strips having different lengths are aligned with each other in a longitudinal direction of the rubber sheet strips;
first holding members for holding a front end portion of a following stacked and joined strip made by the sheet overlaying unit;
second holding members for holding a rear end portion of a preceding stacked and joined strip made by the sheet overlaying unit;
support guides for movably supporting the first holding members relative to the second holding members; and
an operating unit for moving the first holding members relative to the second holding members to butt-join the side surfaces of two successive stacked and joined strips held respectively by the first holding members and the second holding members to generate a ply sheet for the body ply of the tire.

2. A rubber sheet joining apparatus, comprising:
a cutting unit for cutting ribbon of cords reinforced rubber sheet at a right angle to a longitudinal direction of the ribbon in different lengths to generate plural different rubber sheet strips having different lengths, one of the plural different rubber sheet strips having a length corresponding to a width of a body ply of a tire, the cords extending in the longitudinal direction of the ribbon;
a sheet overlaying unit for providing the plural different rubber sheet strips having different lengths made by the cutting unit to a certain position to stack and join the plural different rubber sheet strips having different lengths to make a stacked and joined strip in which the centers of the plural different rubber sheet strips having different lengths are aligned with each other in a longitudinal direction of the rubber sheet strips;
first holding members for holding a front end portion of a following stacked and joined strip made by the sheet overlaying unit;
second holding members for holding a rear end portion of a preceding stacked and joined strip made by the sheet overlaying unit;
support guides for movably supporting the first holding members relative to the second holding members;
an operating unit for moving the first holding members relative to the second holding members to butt-join the side surfaces of the two successive stacked and joined strips respectively held by the first holding members and the second holding members to generate a ply sheet for the body ply of the tire;
a feeding unit for feeding the ply sheet by a certain distance to a position where the rear side surface of the preceding stacked and joined strip just butt-joined to the ply sheet by the operating unit is located at a certain position where the second holding members holds the rear end portion of the preceding stacked and joined strip; and a piercing unit for performing piercing treatment through the ply sheet fed by the feeding unit.

3. The rubber sheet joining apparatus according to claim 2, wherein, the strips having different lengths are stacked and joined by the sheet overlaying unit such that the cords abided therein are aligned in a row both in width direction and up and down direction in a cross section of the stacked and joined strip, and the piercing treatment is performed through the stacked and joined strip between the cords.

4. The rubber sheet joining apparatus according to any one of claims 1 through 3, wherein concave-convex portions are formed at the first holding members and the second holding members such that the first holding members and the second holding members can be overlapped with the concave-convex portions meshing with each other.

* * * * *